United States Patent [19]

Hinn et al.

[11] Patent Number: 4,502,073

[45] Date of Patent: Feb. 26, 1985

[54] NOISE SUPPRESSING INTERFACE CIRCUIT IN A KINESCOPE BIAS CONTROL SYSTEM

[75] Inventors: Werner Hinn, Zollikerberg; Hans-Rudolf Fecht, Berikon, both of Switzerland

[73] Assignee: RCA Corporation, New York, N.Y.

[21] Appl. No.: 454,460

[22] Filed: Dec. 29, 1982

[30] Foreign Application Priority Data

Apr. 6, 1982 [GB] United Kingdom ............... 8210219

[51] Int. Cl.³ ............................................. H04N 9/62
[52] U.S. Cl. .................................. 358/10; 358/242; 358/243; 358/65
[58] Field of Search ............... 358/242, 243, 64, 65, 358/74, 10, 139, 27, 33, 34, 40

[56] References Cited

U.S. PATENT DOCUMENTS

| | | | |
|---|---|---|---|
| 4,130,829 | 12/1978 | Kam . | |
| 4,263,622 | 4/1981 | Hinn | 358/242 |
| 4,316,212 | 2/1982 | Rodda | 358/10 |
| 4,387,405 | 6/1983 | Hinn | 358/243 |

OTHER PUBLICATIONS

"Minolta TV Color Analyzer", Technical Bulletin published by Minolta Corp., NY, NY.
Report "Towards True Color Stability in Television", (A. Lavigne), published by Videocolor.

Primary Examiner—Michael A. Masinick
Attorney, Agent, or Firm—Eugene M. Whitacre; Paul J. Rasmussen; Ronald H. Kurdyla

[57] ABSTRACT

An interface circuit in a kinescope bias control system includes a transistor with a base electrode coupled to the output of a kinescope drive amplifier in a television receiver, an emitter electrode coupled to a kinescope cathode, and a collector output coupled to an output circuit which provides signals to signal processing circuits. A current related to the kinescope black current level is applied to the emitter electrode. The signal gain from the base electrode to the output circuit is significantly less than the signal gain from the emitter electrode to the output circuit. Spurious signals including noise from the output of the kinescope driver are thereby significantly attenuated at the output circuit, preventing distortion of black current representative signals provided from the output circuit.

23 Claims, 8 Drawing Figures

HORIZONTAL LINE RATE TIMING

VERTICAL FIELD RATE TIMING

NOISE SUPPRESSING INTERFACE CIRCUIT IN A KINESCOPE BIAS CONTROL SYSTEM

This invention concerns a circuit for coupling low level signals representative of the bias of an image display device in a video signal processing system, to bias control signal processing circuits. In particular, this invention concerns such a circuit for significantly attenuating spurious signals, including noise, which could otherwise produce errors in bias control signals from the signal processing circuits.

A color image reproducing display device such as a kinescope of a color television receiver comprises a plurality of electron guns respectively energized by red, green and blue color image signals. Optimum reproduction of a color image requires that the relative proportions of the color signals be correct at all kinescope drive levels from white through gray to black image content, at which point the three electron guns should exhibit significantly reduced conduction and conduct an associated very small black image current.

The optimum reproduction of a color picture and the gray scale response of the kinescope can be adversely affected when the bias of the electron guns varies from a desired level, causing unwanted black current errors to be produced. These errors are visible as a color tint on a displayed monochrome picture, and also upset the color fidelity of a displayed color picture. Black current errors can be caused by a variety of factors, such as kinescope aging and temperature effects, for example.

Several techniques are know for establishing the black current level of a kinescope. For example, some television receivers employ a "service switch" which, when placed in a "service" position, causes the kinescope to display a narrow horizontal line. A service technician then adjusts the bias of each kinescope electron gun until a barely visible, narrow white horizontal line is produced, corresponding to a condition of nominally correct kinescope black current bias. This technique is described, for example, in U.S. Pat. No. 4,118,729—Shanley. This type of bias adjustment is often difficult to perform with predictable accuracy on a reproducible basis because the "correct" brightness level of the dim narrow horizontal line associated with "correct" kinescope black current bias is a function of subjective interpretation from one service technician to another, the viewing distance, and the ambient light level, all of which can vary.

Another kinescope bias adjustment system intended to eliminate the uncertainties and variations of visual judgement employs a light sensitive detector probe including a plurality of light sensitive diodes or similar devices secured to the face of the kinescope such as by means of a suction device. The probe responds to the brightness level of the kinescope display for developing a signal that drives an indicator (e.g., a voltmeter) to indicate the intensity of the kinescope display. With this electro-optical system, however, the light sensitive probe devices typically are not sensitive enough to provide a reliably accurate indication of the intensity of the dim horizontal line displayed by the kinescope when the black current level is being adjusted. In addition, the light sensitive devices can undesirably exhibit non-linearities at low light levels, and ambient light may affect the operation of the devices.

U.S. Pat. No. 4,316,212—Rodda discloses a system for setting kinescope black level bias in a manner which eliminates the uncertainties and variations of visual judgement, and which avoids the problems associated with an electro-optical system as discussed above. However, in practice the Rodda system is limited to use with relatively high black level kinescope currents because of signal processing difficulties associated with the presence of low level spurious signals including noise and interference components.

Some television receivers include an automatic kinescope bias (AKB) control system for automatically maintaining a desired kinescope black current level by means of feedback control action, as shown in U.S. Pat. No. 4,263,622—Hinn, for example. Spurious signals such as noise can introduce bias control inaccuracies in such AKB systems, particularly when very low black current levels are sought to be established.

Accordingly, there is disclosed herein control apparatus for accurately establishing the black current level of a kinescope including a cathode electrode which receives video signals from a kinescope driver amplifier via a cathode signal path. The control apparatus includes an interface network included in the cathode signal path. The interface network includes an active device having a first terminal coupled to the output of the kinescope driver, a low impedance second terminal coupled to the kinescope cathode, and a third terminal coupled to an output circuit. The first and second terminals of the active interface device define a current path from the output of the kinescope driver stage to the kinescope cathode. During black current measuring intervals when video signals are inhibited, the low impedance second terminal of the active device receives a cathode signal representative of the black level bias of the kinescope cathode. This signal appears at the output circuit of the interface device and is afterwards amplified and processed by bias control signal processing circuits. The interface device is arranged such that spurious signals including noise, when present at the output of the kinescope driver stage and at the first terminal of the interface device, are suppressed in the signal developed at the output circuit to prevent distortion of the black level bias representative signal processed by the bias control signal processing circuits.

In accordance with a feature of the invention, a current source provides a substantially constant bias current to the second terminal of the active interface device during the occurrence of the black level bias representative signal.

In accordance with a further feature of the invention, the output circuit of the interface device is coupled to the current source via a DC feedback path during reference intervals within the measuring intervals, for maintaining a reference bias condition for the interface device and the associated output circuit.

IN THE DRAWING

Figure 1:
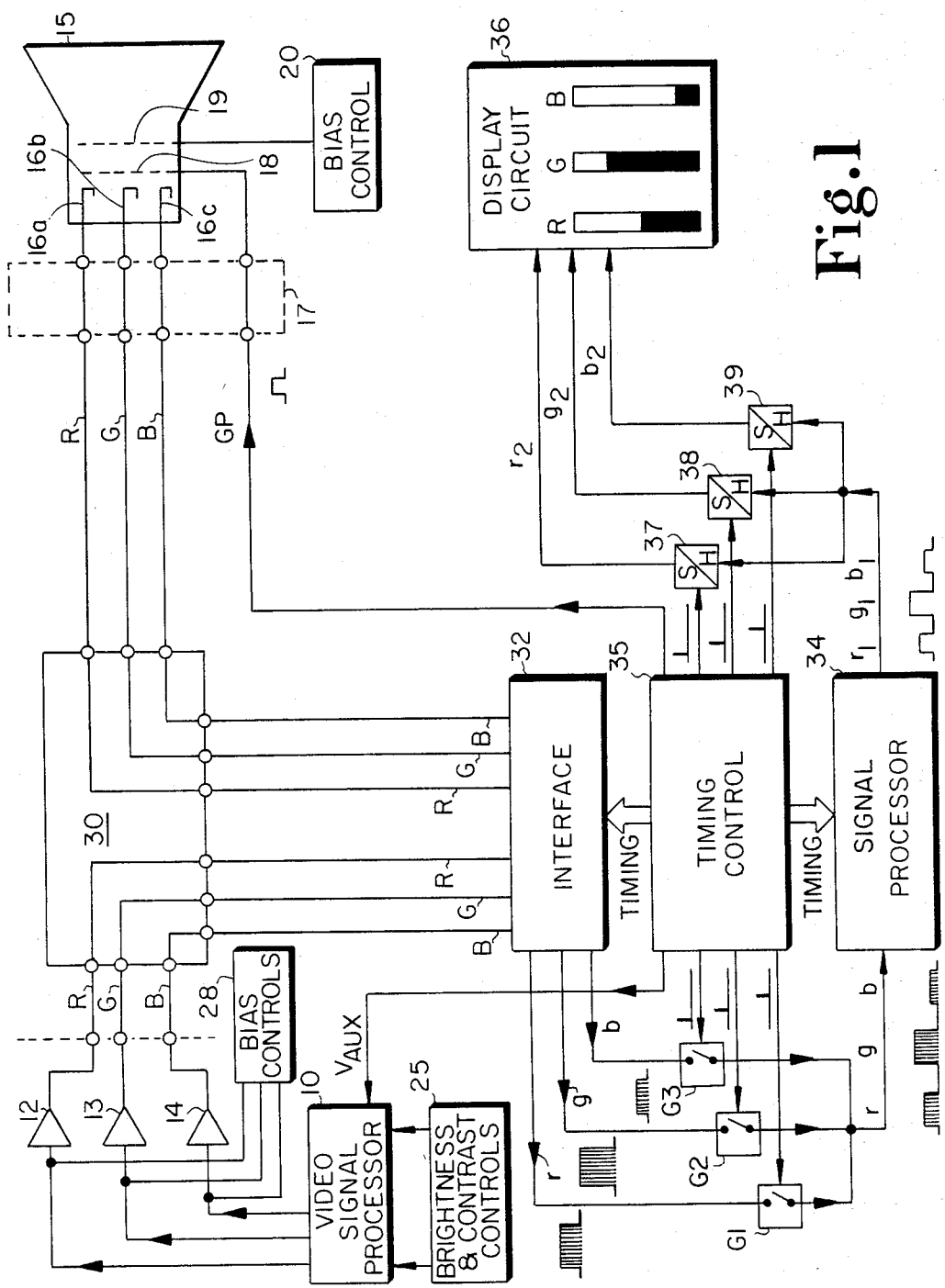
FIG. 1 shows a portion of a television receiver, and control apparatus according to the present invention to facilitate the adjustment of the black current bias of an image reproducing kinescope of the receiver.

In FIG. 1, a video signal processor 10 in a color television receiver supplies low level red, green and blue color image representative video signals to respective kinescope driver amplifiers 12, 13 and 14 (e.g., comprising active load, low output impedance amplifiers). In a normal operating mode of the receiver, the color signal outputs (R, G, B) of the driver amplifiers would be directly connected to cathode electrodes 16a, 16b and 16c of a color kinescope 15 via a kinescope socket connector 17. In this example kinescope 15 is self-converging in-line electron gun type having a control grid 18 energized in common with respect to the electron guns comprising cathodes 16a, 16b and 16c. Kinescope 15 also includes a screen grid 19 which is common to each of the electron guns and which receives bias from an adjustable bias control network 20. A unit 25 includes adjustable image brightness and contrast controls coupled to video processor 10 for respectively controlling the DC level and peak-to-peak amplitude of video signals processed by video processor 10. The operating points and the DC output voltages of kinescope driver amplifiers 12, 13 and 14 are adjustable by means of a bias control network 28 (e.g., comprising plural potentiometers respectively connected to the driver amplifiers).

In a service operating mode of the receiver as depicted in FIG. 1, the R, G, B outputs of the kinescope driver stages are coupled to the associated R, G, B kinescope cathodes via a connector 30 and an interface unit 32. Connector 30 and interface 32 comprise a service instrument together with a signal processor 34, a timing signal generator 35 and a display network 36, for facilitating the adjustment of the kinescope black current level. The kinescope black current corresponds to a very small current (sometimes as small as one microampere) conducted by the kinescope electron guns during the display of black image information. The desired (correct) black current level is subject to undesirably increasing or decreasing relative to the desired level due to aging of the kinescope, temperature effects, and kinescope electron gun tolerances, among other factors.

The service instrument comprising interface 32 and processor 34 is highly immune to the effects of spurious signals including noise, and permits kinescope black image currents as small as one microampere to be established accurately.

During the service mode, the video signals normally processed by video signal processor 10 are replaced by an auxiliary video signal $V_{AUX}$. This signal is produced by timing generator 35 and corresponds to a black image representative video signal including composite horizontal and vertical image synchronizing signal components. This signal causes the R, G, B signal outputs of kinescope driver stages 12, 13, 14 to exhibit a DC level corresponding to black video image information during image intervals. The auxiliary video signal can be applied directly to video processor 10 via an appropriate input, or it can be applied to the antenna terminals of the receiver via a video RF modulator, for example.

Plural input circuits of interface unit 32 act in combination with connector 30 to respectively couple the R, G, B outputs of drivers 12, 13, 14 to kinescope cathodes 16a, 16b, 16c. Interface unit 32 also provides output signals r, g and b, the magnitudes of which are related to the level of black current conducted by the associated R, G, B kinescope electron gun. The magnitudes of signals r, g and b are a function of electron gun conduction produced in response to a positive composite grid drive pulse GP developed by timing generator 35 and applied to kinescope control grid 18 during bias measuring intervals.

Composite grid drive pulse GP recurs at the vertical field scanning rate. Each composite grid drive pulse comprises a sequence of 128 positive pulses and an equal number of associated reference levels, generated during 128 consecutive horizontal image line scanning (trace) intervals within each vertical field scanning (trace) interval. In this connection reference is made to waveforms A-D in FIG. 5. Waveform A illustrates a horizontal line interval, including image trace and retrace portions. A horizontal rate measuring interval, during which kinescope black level bias is monitored by the disclosed system, includes a pulse interval followed by a reference interval, both occurring during the horizontal image trace interval. Each horizontal rate pulse component (waveform B) of the composite grid pulse signal is generated during the pulse interval. A reference level (e.g., zero volts) is generated by timing generator 35 during the reference interval. The measuring interval, and the associated pulse and reference components, occurs 128 times during each vertical field scanning (trace) interval. Waveform C illustrates a sequence of three vertical field intervals. During the trace portion of each field, a composite grid drive signal (GP) comprising a sequence of 128 positive horizontal rate pulses and associated reference levels appear as illustrated by waveform D.

Each of the 128 horizontal rate pulses constituting composite grid drive pulse GP biases the R, G, B kinescope electron guns for increased conduction, and each kinescope cathode by cathode follower action produces similarly phased horizontal rate output current pulses in response to each horizontal rate grid pulse. The magnitude of each induced cathode output current pulse is representative of the level of conduction of the associated kinescope electron gun.

Figure 5:
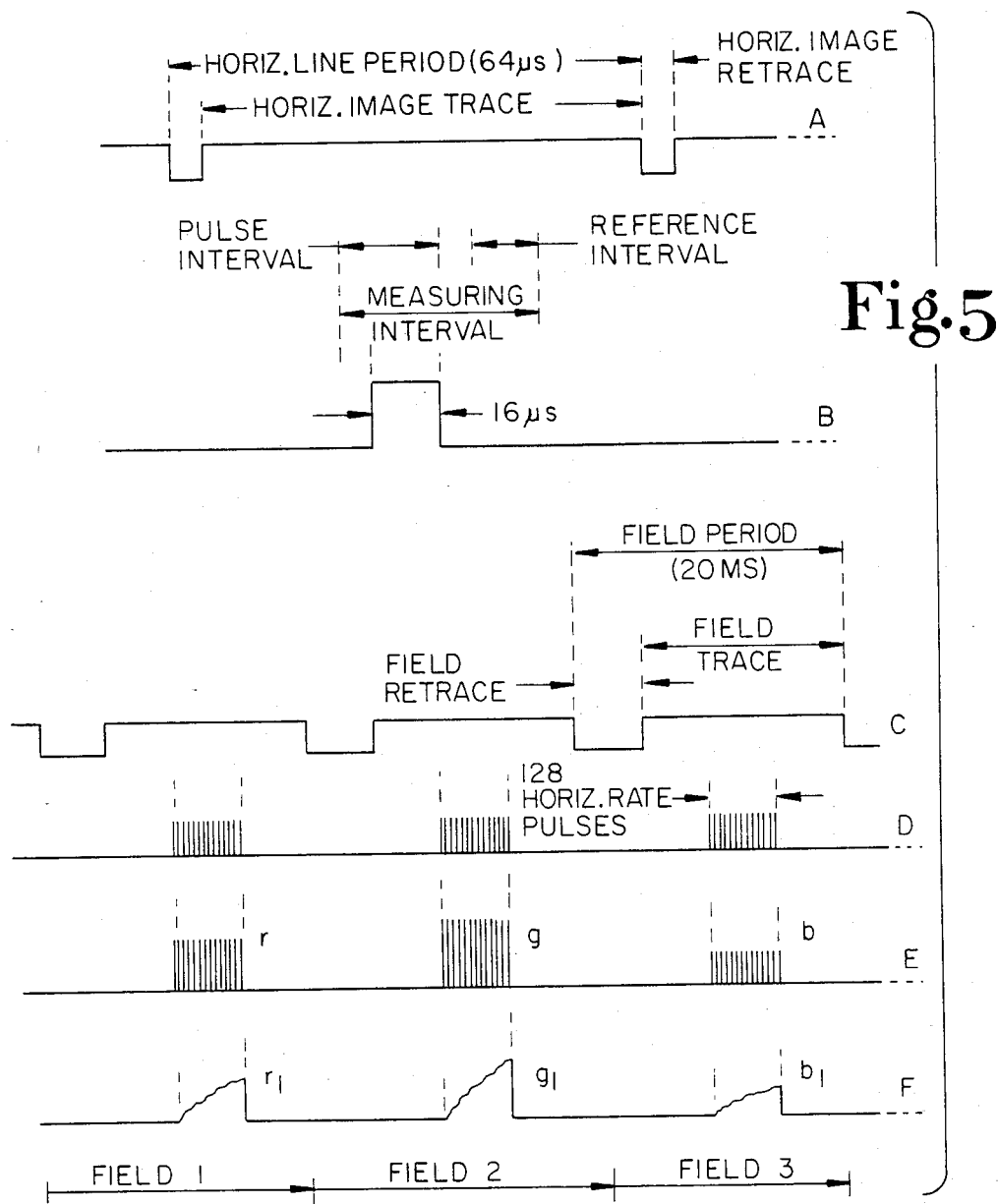

Interface unit 32 converts each group of 128 cathode output current pulses into corresponding composite voltage pulses represented by signals r, g and b. These composite voltage pulses are multiplexed by field sequential analog gates G1, G2 and G3 to produce multiplexed signals r, g and b in serial form at the input of signal processor 34, which integrates these signals individually as will be discussed. Waveform E in FIG. 5 depicts the serial r, g, b signal inputs to processor 34, and waveform F illustrates the associated integrated signals $r_1$, $g_1$, $b_1$. Each of the r, g, b signals recurs every fourth vertical field, and the magnitudes of signals r, g, b and $r_1$, $g_1$, $b_1$ vary in accordance with the level of the black current conducted by the associated kinescope electron gun. The magnitudes of these black current representative signals are not influenced by kinescope heater-to-cathode leakage currents because of the grid drive pulse technique employed to generate these signals.

The magnitudes of integrated signals $r_1$, $g_1$, $b_1$ are respectively sampled by field sequentially keyed sample-and-hold circuits 37, 38 and 39, which also function as field sequential de-multiplexing switches, to provide output pulse samples $r_2$, $g_2$, $b_2$ in parallel form. The latter signals exhibit magnitudes related to the black current level of the associated R, G, B kinescope electron guns, and are supplied to respective inputs of display circuit 36.

Display circuit 36 comprises three vertical bar display segments respectively responsive to the magnitudes of signals $r_2$, $g_2$ and $b_2$. Accordingly, each bar display segment indicates the level of black current conducted by the associated R, G, B kinescope electron gun. As necessary, one or more of the bias controls in unit 28 are adjusted until the bar displays indicate that the electron gun black current levels are equal, or exhibit some other desired mutual relationship.

Interface unit 32 includes three similar circuits respectively associated with the R, G and B cathode signal paths. Details of the interface circuit for the R (red) cathode signal path are shown in FIG. 2.

Figure 2:
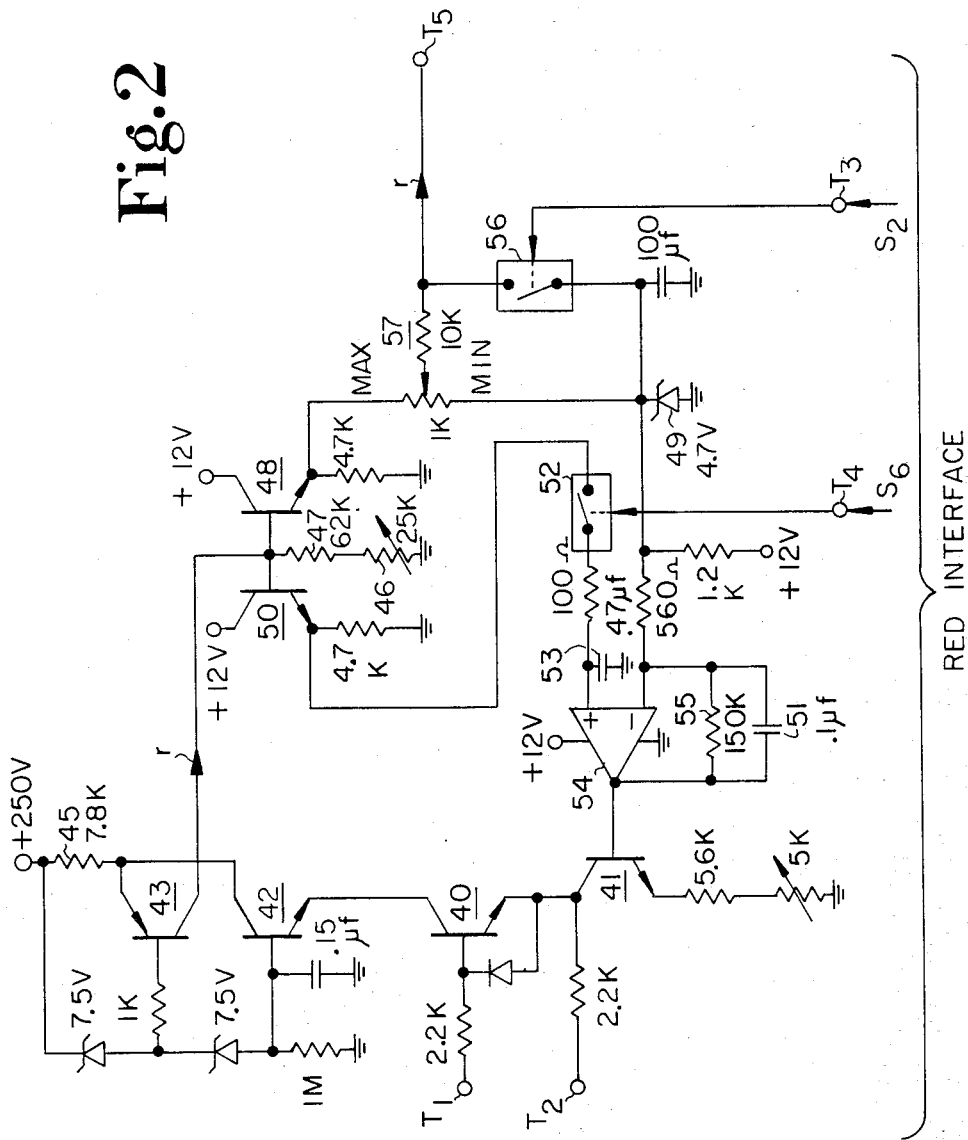
FIGS. 2–4 and 8 show circuit details of portions of the apparatus of FIG. 1, and FIGS. 5–7 show waveforms associated with the operation of the control apparatus and associated circuits in FIG. 1.

In FIG. 2, the output of driver amplifier 12 is coupled via connector 30 to a terminal $T_1$ at a base input of a transistor 40, and kinescope cathode 16a is coupled via connector 30 to a terminal $T_2$ at the low impedance emitter of transistor 40. Transistor 40 acts as an emitter follower with respect to the signal path from the output of driver 12 to kinescope cathode 16a. The emitter of transistor 40 corresponds to a low impedance input for the induced black current representative cathode output current pulses developed as discussed previously. A current source transistor 41 is coupled to the emitter of input transistor 40. The collector of transistor 40 is coupled to an output circuit comprising transistor 42, a resistor 45, and the emitter of a transistor 43. Resistor 45 serves to translate the input current pulses to voltage pulses across resistor 45. The voltage pulses developed across resistor 45 are amplified by emitter input common base amplifier transistor 43, and the amplified voltage pulses appear across resistors 46, 47 in the collector output circuit of transistor 43. Timing signals $S_2$ and $S_6$ are respectively applied to terminals $T_3$ and $T_4$, and signal r appears at an output terminal $T_5$.

The black level DC voltage output from kinescope driver 12 is applied to the base input of transistor 40 via terminal $T_1$, and the induced cathode output current pulses are applied to the low impedance emitter input of transistor 40 via terminal $T_2$. Each input black current representative current pulse is translated to a voltage pulse across resistor 45. Each voltage pulse is amplified by transistor 43 and appears in amplified form across load resistors 46, 47, and is coupled to output terminal $T_5$ via a unity voltage gain emitter follower transistor 48 and an output level control potentiometer 57. The variable amplitude of output pulse signal r is referenced to a DC voltage determined by a Zener reference diode 49 and the pre-set position of potentiometer 57.

Figure 6:
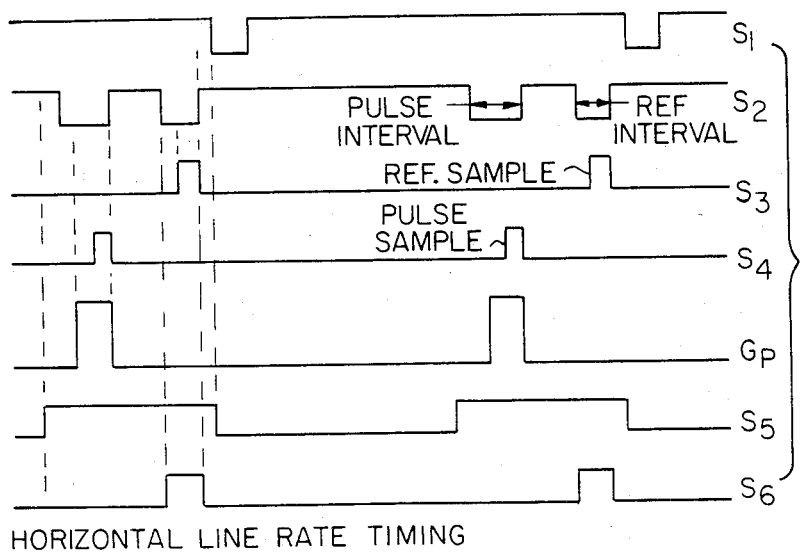

The interface circuit also includes a feedback path comprising transistors 40, 42, 43, a transistor 50, an electronic switch 52, an operational amplifier 54, and current source transistor 41. The feedback path is operative during the reference intervals within each measuring interval, when switch 52 is rendered conductive (i.e., closed) in response to timing signal $S_6$, as shown in FIG. 6. The feedback path controls the DC current provided by current source transistor 41 such that the quiescent emitter current of transistor 40 and the quiescent DC current conducted by resistor 45 are substantially constant and insensitive to changes in the level of the DC voltage applied to the base of transistor 40 from the output of kinescope driver 12. Thus the quiescent DC voltage across resistor 45 is unaffected by the setting of the brightness control (coupled to video processor 10 in FIG. 1). Accordingly, the voltage change across resistor 45 is influenced only by the level of the black image representative cathode current pulses conducted to the emitter of transistor 40. In the absence of the feedback path, the voltage across resistor 45 would be undesirably influenced by currents produced in response to variations of the DC voltage applied to the base of transistor 40, which would distort the level of output signal r.

More specifically, during each reference interval a voltage related to the voltage across resistor 45 is coupled via switch 52 to a storage capacitor 53 at the noninverting (+) signal input of amplifier 54. Amplifier 54 compares this input voltage with a reference voltage, related to the voltage provided by Zener diode 49, at the inverting (−) input of amplifier 54. The output voltage of amplifier 54 is related to the difference between its input voltages, and provides the base bias for current source transistor 41. For example, if the quiescent voltage across resistor 45 is sensed during the reference interval as having increased from a nominal value in response to a change in the DC base voltage of transistor 40, the output voltage of amplifier 54 correspondingly decreases to reduce the current sourced by transistor 41, causing a corresponding reduction in the quiescent emitter current of transistor 40 and in the quiescent voltage drop across resistor 45. The bias voltage at the output of amplifier 54 is maintained after switch 52 opens at the end of the reference interval, since reference voltage source 49 remains connected to the inverting amplifier input, and capacitor 53 retains the voltage supplied to it during the reference interval. In addition, amplifier 54 corresponds to an integrating amplifier with a long time constant (determined by the values of feedback resistor 55 and feedback capacitor 51) relative to the measuring interval, thereby ensuring that the current provided by current source transistor 41 is substantially constant during each input pulse interval, when switch 52 and the feedback control loop are open.

An electronic switch 56 coupled to the output signal path is non-conductive during the pulse and reference intervals and is conductive at other times in response to timing signal $S_2$ as shown in FIG. 6, to prevent unwanted signals from appearing at output terminal $T_5$ during such other times. FIG. 6 also depicts horizontal rate grid drive pulse GP.

Spurious signals including noise and interference components typically encountered in a television receiver exhibit magnitudes which are significant relative to the very small input currents (on the order of a few microamperes) to which the kinescope bias control system responds. As such, the spurious signals can distort the magnitude of output signal r at terminal $T_5$ and produce measuring errors. Such spurious signals can include noise associated with circuits comprising video signal processor 10 (e.g., tuner, RF, IF, and luminance/chrominance signal processing stages), as well as noise and interference associated with the power supply and deflection circuits of the receiver. The spurious signals can be conveyed to the kinescope driver stage via signal coupling paths and power supply connections, and can appear at the output of the kinescope driver and at the base input of transistor 40 of the interface circuit. The disclosed interface circuit is arranged to substantially reduce the effects of such spurious signals, as follows.

The voltage gain from the base input of transistor 40 to the collector output of transistor 42 is determined by the ratio of the collector resistance ($R_C$) of transistor 42 to the emitter resistance ($R_E$) of transistor 40. The emitter resistance $R_E$ of transistor 40 is primarily determined by the kinescope cathode impedance, which is approximately 100 kilohms for cathode currents on the order of 1 microampere. The collector resistance $R_C$ of transistor 42 is determined by the value of load resistor 45 (7.8 kilohms), in parallel with the impedance presented by the emitter of transistor 43 (approximately 420 ohms in this case). Thus the collector resistance of transistor 42 is approximately 420 ohms, and the voltage gain $R_C/R_E$ is approximately 0.004. Accordingly, spurious signals including noise from the output of the kinescope driver stage are greatly attenuated across resistor 45 and at the collector output of transistor 43, since such spurious signals are amplified with a very small gain factor of only 0.004. The input current pulse applied to terminal T2 is not attenuated by this gain factor because the current pulse is applied to the emitter input rather than to the base input of transistor 40, and appears in amplified form across resistors 46, 47 at the base of follower transistor 48.

The noise immune operation of the interface circuit is enhanced by the fact that transistor 41 is a source of substantially constant current during the pulse intervals. As such, the current provided by transistor 41 is not influenced by the instantaneous values of spurious signals including noise at the base input of transistor 40. In addition, the impedance presented by the collector of constant current source transistor 41 to the emitter of transistor 40 is very high relative to the (approximately 100 kilohm) impedance presented by the kinescope cathode which is connected to the emitter of transistor 40. The emitter impedance $R_E$ of transistor 40 corresponds to the parallel combination of the cathode impedance and the impedance presented by transistor 41. If the impedance presented by transistor 41 was lower, i.e., if transistor 41 was not a constant current source, gain factor $R_C/R_E$ would be higher, resulting in greater amplification of spurious signals including noise. With the disclosed arrangement, however, the desirably small noise gain factor of 0.004 is maintained.

The interface circuit exhibits a large signal gain of approximately 87,000 (output volts/input current) for high sensitivity, which is required in view of the very small input currents being processed. The feedback loop also exhibits high gain, and permits the interface circuit to exhibit a large dynamic range. In the absence of the feedback loop, a much smaller signal gain would be necessary to prevent shifts in the DC operating point of the interface circuit from affecting the desired linear operating range of the interface circuit. The feedback loop also advantageously establishes a signal processing reference condition with respect to output signal r to assure that DC level shifts (e.g., across resistor 45 in response to variations in the base voltage of transistor 40) do not distort the magnitude of output signal r, which is later sampled.

In addition, the coupling of interface transistor 40 in the cathode signal path has a negligible effect on the high voltage biasing of the cathode signal path, since transistor 40 introduces a negligibly small voltage offset (+0.7 volts) in the cathode signal path.

The interface circuit can be employed in conjunction with a service instrument as disclosed herein, or separately as part of an automatic kinescope biasing (AKB) system included in a television receiver, for coupling pulses representative of the kinescope black current level to bias control signal processing circuits of the AKB system.

Figure 3:
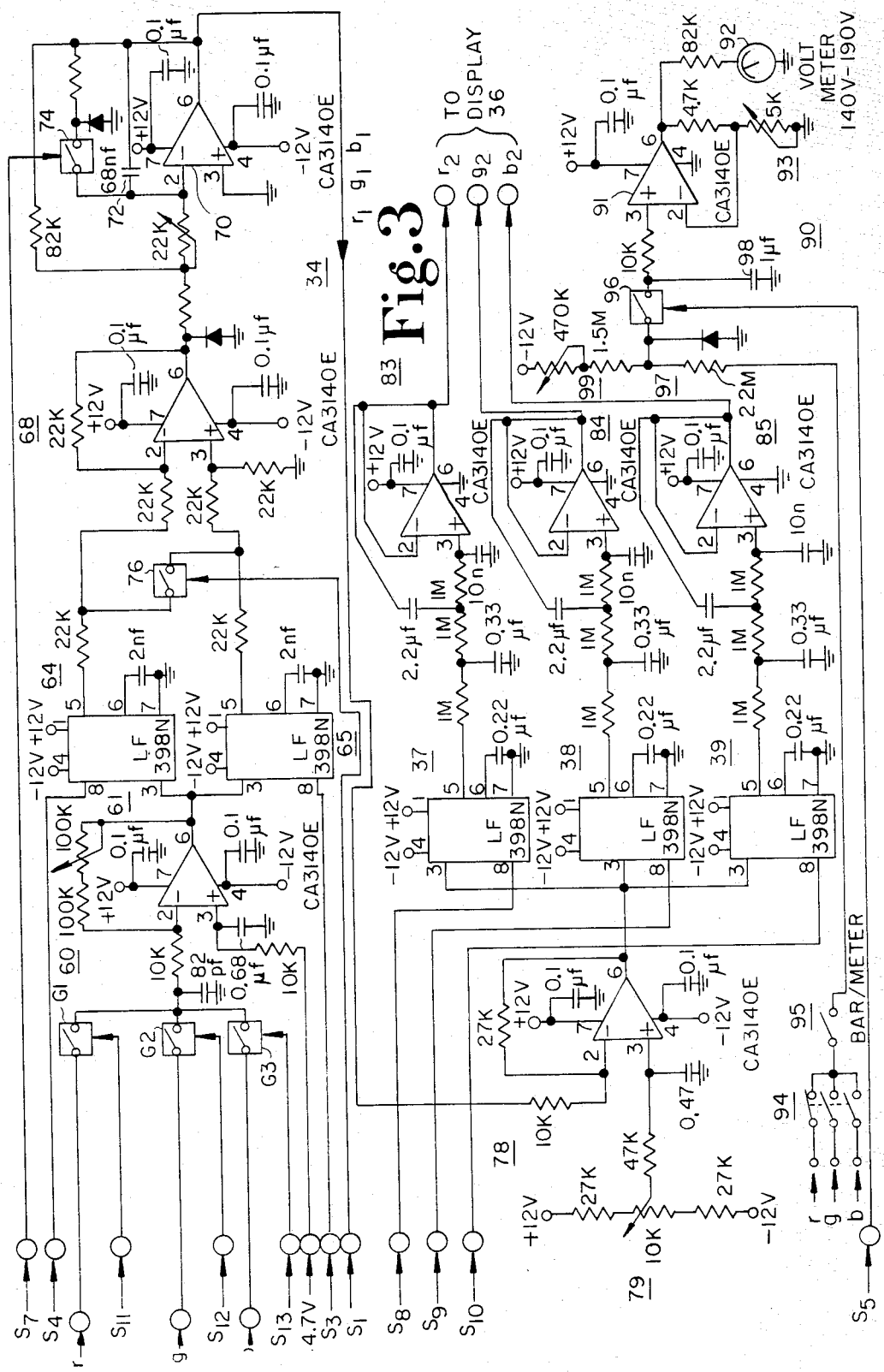

FIG. 3 shows circuit details of signal processor 34 in FIG. 1.

Figure 7:
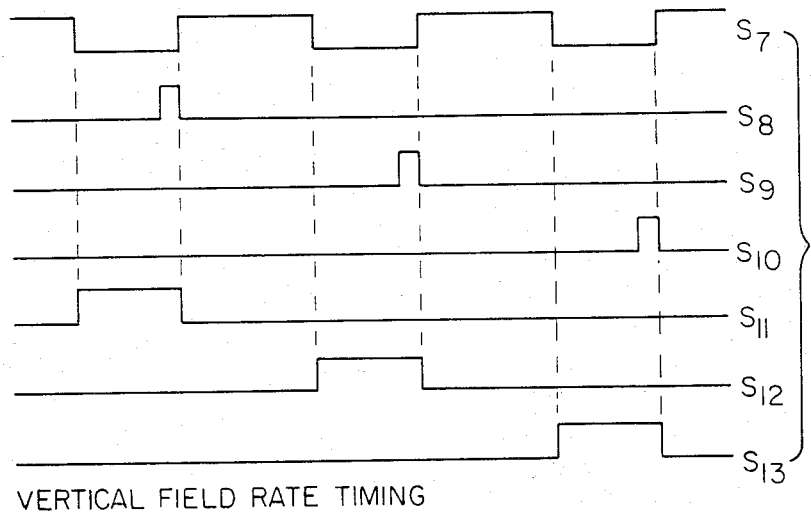

Signal processor 34 operates in common to each of input signals r, g and b provided from the interface circuits. Signals r, g and b, each comprising a group of 128 horizontal rate pulses, are converted to field sequential serial form (see waveform E in FIG. 5) at the input of an operational amplifier 60 by means of field sequential gates G1, G2 and G3. These gates respectively respond to field sequential timing signals $S_{11}$, $S_{12}$ and $S_{13}$ as shown in FIG. 7.

A pulse sample and hold circuit 64 operates in response to horizontal rate timing signal $S_4$ (shown in FIG. 6) for sampling and storing the magnitudes of each horizontal rate pulse component of signals r, g and b. A reference level sample and hold circuit 65 responds to horizontal rate timing signal $S_3$ (shown in FIG. 6) for sampling and storing the DC reference level appearing during each horizontal rate reference interval. Circuits 64 and 65 provide 128 pulse and reference samples for each field. A differential amplifier 68 provides output signals related to the difference between the pulse and reference level sampled outputs of sampling circuits 64 and 65.

An electronic switch 76, coupled across the inputs of differential amplifier 68, opens shortly after the reference interval within each measuring interval, to permit the output samples from sampling circuits 64 and 65 to be respectively applied to the differential inputs of amplifier 68. Switch 76 is conductive (i.e., closed) at all other times, thereby providing a zero differential voltage to the inputs of differential amplifier 68 whereby amplifier 68 then exhibits a zero output level. Switch 76 responds to timing signal $S_1$ shown in FIG. 6.

Field rate output signals from differential amplifier 68 are integrated by means of a network including an integrating amplifier 70 and an associated integrating capacitance 72. The integrated output signals from amplifier 70 correspond to signals $r_1$, $g_1$, $b_1$ as indicated by waveform F in FIG. 5.

In order to provide independent field rate integrated output samples $r_1$, $g_1$, $b_1$, the integrating network is reset after every field when an electronic switch 74 is closed in response to timing signal $S_7$ shown in FIG. 7. Electronic switch 76 is also closed at this time in response to timing signal $S_1$, so that a zero differential voltage appears across the inputs of amplifier 68 and a zero output voltage is provided by amplifier 68. When switches 74 and 76 are conductive, the inverting (−) and non-inverting (+) inputs and the output of amplifier 70 are reset to zero volts, and integrating capacitor 70 is discharged.

The field rate integrated voltage pulses from the output of integrator 70 are amplified by an operational amplifier 78. Samples of the field rate amplified pulses from amplifier 78 are provided in de-multiplexed parallel form at the outputs of field sequential sampling circuits 37, 38, 39 which respectively respond to timing signals $S_8$, $S_9$ and $S_{10}$ as shown in FIG. 7. The de-multiplexed output signal samples from sampling circuits 37, 38, 39, before being applied to display circuit 36 as signals $r_2$, $g_2$ and $b_2$, are low-pass filtered by active filters 83, 84, 85 to damp the signals to produce a steady display.

The black level voltage of each kinescope cathode can be monitored individually by means of a circuit 90, which includes a voltmeter 92, a three position manual "cathode select" switch 94, and a manual "bar display/meter display select" switch 95, among other circuit elements. For example, to monitor the red kinescope cathode black level voltage via voltmeter 92, switch 94 is placed in the "red" cathode position as shown, and switch 95 is closed for coupling signal r from the interface circuit to the input of an electronic switch 96 via an attenuator circuit 97. Switch 96 closes (conducts) in response to timing signal $S_5$ (FIG. 6) during portions of each horizontal line interval between the measuring intervals, at which times the level of signal r is representative of the black level cathode voltage. A capacitor 98 stores a voltage related to the level of signal r, which is coupled to meter 92 via a meter driver amplifier 91. Voltmeter 92 is calibrated by means of adjustable resistors 93 and 99.

The signal gain of signal processor 34 together with the signal gain of interface circuit 32 yields an overall system gain of approximately $10^6$ (output voltage/input current). Thus a one microampere black level representative current applied to the input of the interface circuit will develop a one volt output signal ($r_2$, $g_2$ or $b_2$) for driving display circuit 36.

The described technique of integrating a large number (e.g., 128) of black current representative pulses to produce the output signal samples results in enhanced system noise immunity. In this respect it is noted that output signals from differential amplifier 68 are subject to including uncorrelated random noise components of significant magnitude relative to the small signals processed by the interface circuit. Such noise can be generated by preceding circuits of the system (e.g., in the interface circuit), and noise from external sources as picked up by interconnecting cables between the receiver and the service instrument.

Integrating a large number of pulses during each field (i.e., providing a long integrating time) increases the signal-to-noise ratio of the sampled cathode pulse information, which represents correlated information relative to random, uncorrelated spurious signals including noise. Experiments have indicated that, in a system of the type described, a signal sample derived from approximately 80 samples per field yields an acceptably high signal-to-noise ratio for the sampled signal. This system employs 128 samples because this number corresponds to an integral power of 2 (i.e., $2^7$), and as such is easily generated by digital control circuits in the timing signal generator. Factors determining the minimum, maximum, and optimum number of samples per field include the type and intensity of the spurious signals, and the requirements of a given system. In general, in a television receiver or similar system, the number of line samples per field (e.g., 80) should be significant relative to the total number of lines per field (256 lines).

Field sequential multiplexing of the r, g, b signals to be sampled advantageously permits a single signal processor to be used in common to each of these signals, whereby identical measuring conditions exist for these three signals. Specifically, factors such as component tolerances, signal processing offsets and temperature induced drift associated with the common signal processor affect the processing of all three signals in the same way. This results in identical signal processing errors associated with the development of output signals $r_2$, $g_2$, $b_2$, which permits the electron gun black level currents to be mutually balanced. In this regard it is noted that the described system exhibits very high gain in order to produce high sensitivity to the very small input signals being processed. Since high gain magnifies the effect of signal processing errors, it is important to reduce the impact of such errors upon the ultimate result of accurately setting (e.g., balancing) the kinescope black current levels. This is accomplished in the disclosed high gain system by means of field sequential multiplexing in combination with common signal processing.

The described technique for developing kinescope black current representative output signal samples in response to integrating a large number of horizontal rate pulses on a field sequential basis, in combination with multiplexing/de-multiplexing circuits and a common signal processing circuit, can be used in conjunction with an AKB control network in a television receiver. In such case the sampled output signals associated with each kinescope electron gun (e.g., the outputs from sampling circuits 37, 38, 39) can be used in conjunction with comparator circuits for providing automatic feedback control of kinescope bias. Illustratively, the outputs of sampling circuits 37, 38, 39 can be compared with a reference level to provide comparator output bias control signals indicating whether the black current levels of the associated electron guns are correct, too high, or too low with respect to a desired black current level. The bias control signals can be fed back to bias control inputs of the associated kinescope driver stages for controlling their output bias level with a sense for changing the kinescope cathode bias voltage in a direction to produce the desired correct cathode black current level by feedback action. In such a system, the horizontal rate measuring intervals (comprising pulse and reference intervals) could be repeated on six consecutive horizontal lines during vertical image blanking intervals, between the end of the vertical retrace interval and the beginning of the vertical field trace interval. Fourteen vertical fields would produce 84 measuring intervals (i.e., 84 black current representative pulses). Thus for each electron gun the associated output signal sample would be developed by integrating 84 pulses as developed over fourteen field intervals, and sampling the integrated signal. Appropriate timing signals would be required for such a system.

Figure 4:
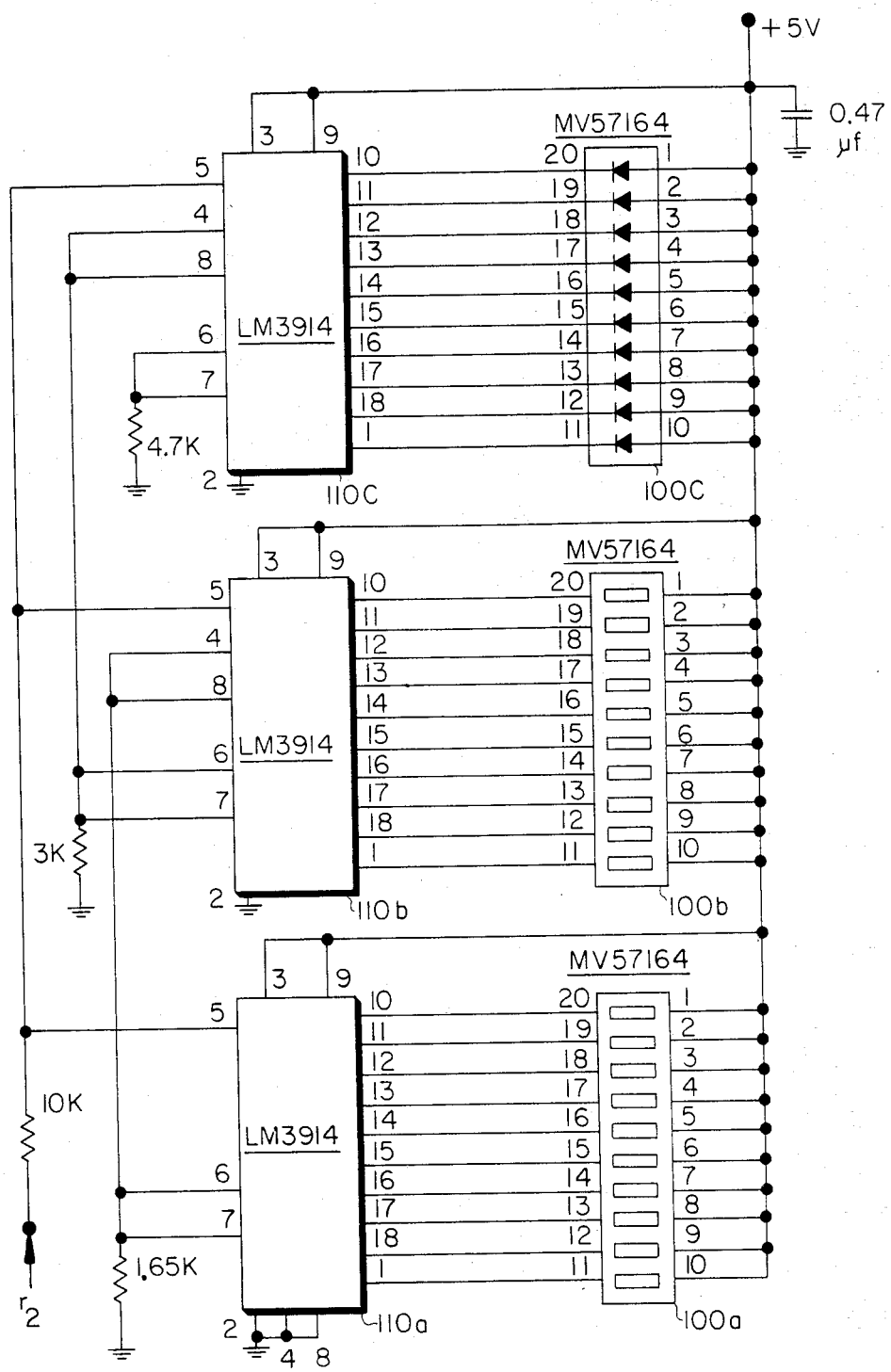

FIG. 4 shows details of display circuit 36 in FIG. 1. Only one of the three identical vertical bar display units is shown. Each display unit comprises three vertically stacked display segments 100a, 100b, 100c, each with ten light-emitting diodes (LEDs) respectively driven by display drivers 110a, 110b and 110c in response to signals (e.g., $r_2$) from signal processor 34. The number of LEDs illuminated is related to the magnitude of the black current of the associated kinescope electron gun.

Figure 8:
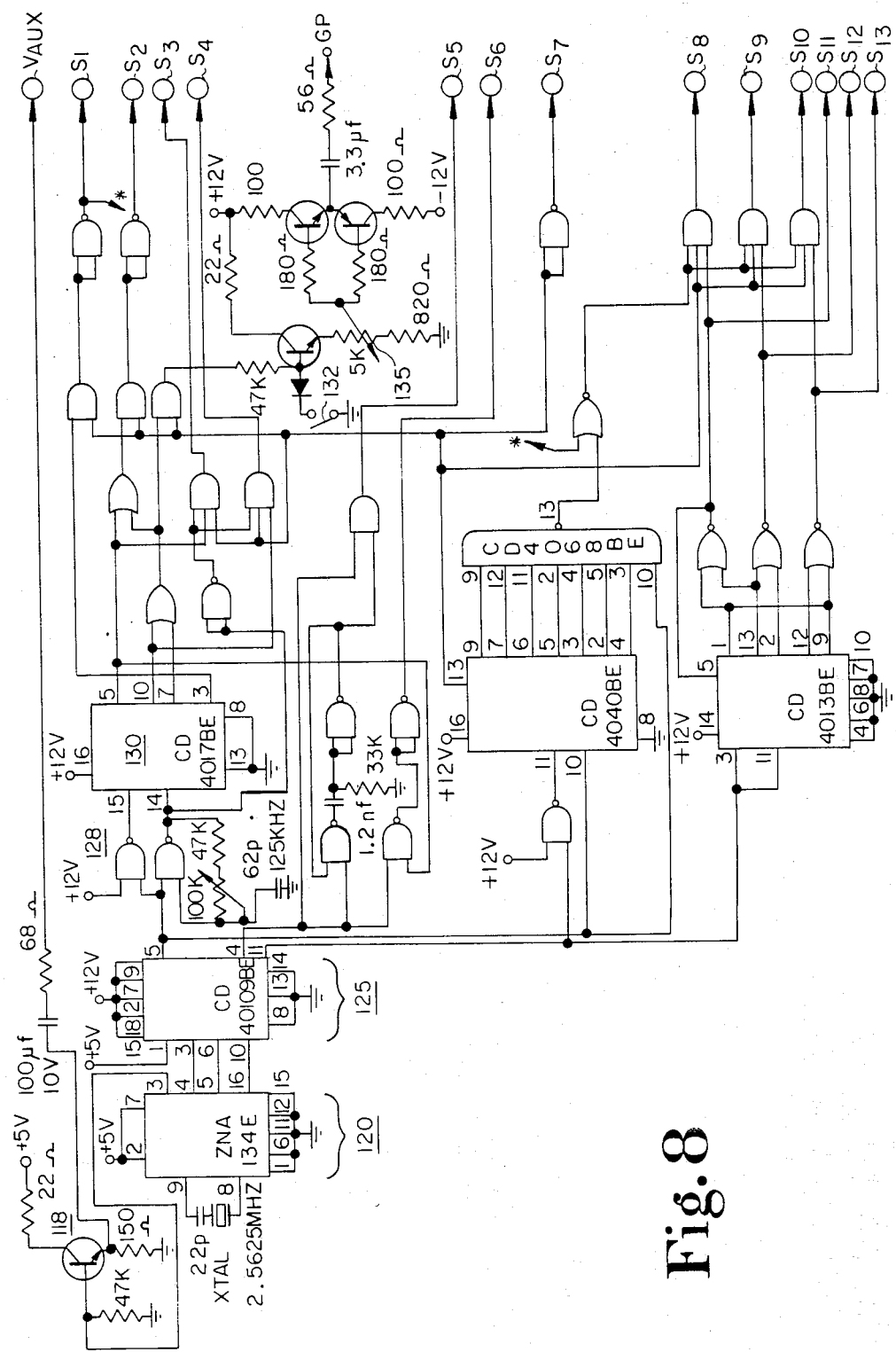

FIG. 8 shows circuit details of timing signal generator 35 in FIG. 1.

Auxiliary video signal $V_{AUX}$, including composite synchronizing and black level information components, is provided from the emitter output of a transistor 118 in response to signals developed at terminal 3 of a television signal generator integrated circuit 120 (type ZNA 134E). Timing signals provided at terminals 4, 5 and 16 of circuit 120 time the operation of sequential and combinational logic circuits for developing timing signals $S_1$-$S_{13}$ and grid drive pulse GP. Circuit 125 is a level shifter, and circuit 128 comprises a gated astable oscillator for supplying 125 KHz clock signals to a counter 130.

The described service instrument can be used to set the kinescope black current levels in the following manner.

The contrast control associated with unit 25 (FIG. 1) is set to a minimum signal gain position, the brightness control is adjusted to a nominal mid-range position, and kinescope screen grid bias control network 20 is adjusted to provide a minimum bias voltage at the kinescope screen grid. Switch 95 (FIG. 3) is placed in the "meter" position (i.e., closed), and for each position of cathode select switch 94 the associated electron gun black level bias control in network 28 of FIG. 1 is adjusted for a desired maximum electron gun cut-off voltage as indicated by voltmeter 92. The value of this voltage is usually specified by the kinescope manufacturer, and is often on the order of +150 volts. Switch 95 is then placed in the "bar display" position (i.e., open as shown).

Maximum black current sensitivity is achieved as follows. The output level control associated with each interface circuit (e.g., potentiometer 57 in FIG. 2) is set to the "MAX" position. A switch 132 in the timing generator circuit of FIG. 8 is placed in the "closed" position to inhibit grid pulse GP, and the wiper of a potentiometer 135 is set to the extreme upper position, corresponding to a maximum amplitude setting for grid pulse GP. A sensitivity control corresponding to a variable resistor 61 in the signal processor circuit of FIG. 3 is set to the extreme right position for maximum gain of amplifier network 60. Also in the circuit of FIG. 3, a "zero adjust" potentiometer 79 coupled to amplifier 78 is adjusted until the three bar displays just become visible (i.e., the lowermost LED of each of the three bar display segments becomes illuminated). Switch 132 in FIG. 8 is then opened to enable grip pulses GP.

The kinescope screen grid bias is increased via bias control 20 in FIG. 1 until one of the bar displays begins rising, indicating that the associated kinescope electron gun is conducting a measurable black current in response to the grid pulses. Usually all three kinescope electron guns will not exhibit the same conduction response at this time because of different conduction characteristics due to tolerance effects. The black level bias controls associated with the other electron guns are then adjusted to produce a similar rise in the bar displays associated with such other guns. The black level controls are adjusted until the three bar display segments are illuminated at the same level, indicating that the black current levels of the electron guns are mutually balanced. Full scale illumination of all three bar display segments (i.e., all 30 LEDs of each bar display are illuminated) corresponds to a black current level of one microampere for each electron gun.

The described system can measure electron gun currents of up to 200 microamperes, e.g., for adjusting kinescope white current levels. For such maximum currents, sensitivity control 61 is set for minimum resistance, and grid pulse amplitude control potentiometer 135 is set at the extreme lower position to produce a minimum amplitude grid pulse. The system can respond to intermediate current levels via intermediate settings of these controls.

What is claimed is:

1. In combination with a video signal processing system including an image reproducing device comprising an image intensity control assembly responsive to video signals applied thereto; and a driver amplifier for providing at an output thereof signals suitable for driving said intensity control assembly; control apparatus operative during sensing and reference intervals within black image intervals when normal video signal image information is suppressed, comprising:

interface means comprising an active device having a first terminal coupled to said output of said driver amplifier, a second low impedance terminal coupled to said intensity control assembly, and a third terminal coupled to an output network; said first and second terminals comprising a signal path from said driver amplifier output to said intensity control assembly;

bias control signal processing means responsive to signals from said output network for producing a control signal related to the magnitude of black image representative currents conducted by said image display device;

means for deriving a current representative of the black image current of said image reproducing device during said sensing intervals; and means for applying said representative current to said low impedance second terminal of said interface means; wherein the signal gain from said first terminal of said interface means to said output network is significantly less than the signal gain from said low impedance second terminal to said output network, so that spurious signals including noise from said output of said driver amplifier are significantly attenuated at said output network to prevent distortion of black current representative signals processed by said bias control signal processing means.

2. Apparatus according to claim 1, wherein
the impedance exhibited at said second terminal of said interface means is significantly greater than the impedance exhibited by said output network.

3. Apparatus according to claim 2, wherein
said impedance exhibited at said second terminal of said interface means is primarily determined by the impedance exhibited by said intensity control assembly.

4. Apparatus according to claim 2, wherein
said output network comprises means for translating input signal currents applied to said second terminal of said interface means to a corresponding signal voltage.

5. Apparatus according to claim 4, and further comprising
amplifier means coupled to said translating means for providing an amplified version of said signal voltage.

6. Apparatus according to claim 5, wherein
said amplifier means comprises an amplifier device with a low impedance signal input terminal coupled to said translating means.

7. Apparatus according to claim 1 and further comprising
a current source for providing a substantially constant DC operating current to said second terminal of said interface means during sensing intervals when said representative current is present.

8. Apparatus according to claim 7 and further comprising
means for selectively coupling said output network to said current source via a feedback reference path during said reference intervals for biasing said current source to produce a substantially constant current in accordance with the bias of said output network.

9. Apparatus according to claim 8, wherein
said feedback path controls said current source to produce a reference bias condition for said interface means and said output network in the presence of bias variations at said first terminal of said interface means.

10. Apparatus according to claim 9, wherein said feedback path comprises integrating amplifier means.

11. Apparatus according to claim 1, wherein
said interface means comprises a transistor with a base electrode corresponding to said first terminal, an emitter electrode corresponding to said second terminal, and a collector electrode corresponding to said third terminal.

12. Apparatus according to claim 1, wherein
said image intensity control assembly comprises an electron gun including a cathode intensity control electrode for receiving video signals from said driver amplifier, and a grid electrode; and
said deriving means comprises biasing means for modifying the bias of said grid electrode during said sensing interval for inducing increased cathode current conduction to produce a cathode output current representative of the black current bias of said image reproducing device.

13. Apparatus according to claim 12, wherein
a current source provides a substantially constant DC operating current to said second terminal of said interface means during sensing intervals when said induced black current representative cathode current is present;
said output network comprises current to voltage translating means;
the impedance exhibited at said second terminal of said interface means is significantly greater than the impedance exhibited by said output network, and is primarily determined by the impedance presented by said cathode; and
said output network is selectively coupled to said current source via a feedback reference path during said reference intervals for biasing said current source to produce a substantially constant operating current and an associated reference bias condition for said interface means and said output network.

14. A service instrument for use with a television receiver including an image reproducing device comprising an electron gun responsive to video signals applied thereto, said electron gun comprising cathode and grid electrodes; and a driver amplifier for providing at an output video signals suitable for driving said cathode electrode; control apparatus operative during sensing and reference intervals within black image intervals when normal video signal image information is suppressed, comprising:
interface means comprising an active device having a first terminal coupled to said output of said driver amplifier, a second low impedance terminal coupled to said cathode, and a third terminal coupled to an output network; said first and second terminals comprising a signal path from said driver amplifier output to said cathode;
bias control signal processing means responsive to signals from said output network for producing a control signal related to the magnitude of black image representative currents conducted by said image display device;
means for biasing said electron gun during said sensing intervals to induce a cathode current representative of the black image current of said image reproducing device, said representative current being applied to said low impedance second terminal of said interface means; and
means responsive to said control signal for indicating the magnitude of said black current; wherein
the signal gain from said first terminal of said interface means to said output network is significantly less than the signal gain from said low impedance second terminal to said output network, so that spurious signals including noise from said output of said driver amplifier are significantly attenuated at said output network to prevent distortion of black current representative signals processed by said bias control signals processing means.

15. Apparatus according to claim 14, wherein
the impedance exhibited at said second terminal of said interface means is significantly greater than the impedance exhibited by said output network.

16. Apparatus according to claim 15, wherein
said impedance exhibited at said second terminal of said interface means is primarily determined by the impedance presented by said cathode.

17. Apparatus according to claim 14 and further comprising
a current source for providing a substantially constant DC operating current to said second terminal of said interface means during sensing intervals when said representative current is present.

18. Apparatus according to claim 17 and further comprising
means for selectively coupling said output network to said current source via a feedback reference path during said reference intervals for biasing said current source to produce a substantially constant current in accordance with the bias of said output network.

19. Apparatus according to claim 18, wherein
said feedback path controls said current source to produce a reference bias condition for said interface means and said output network in the presence of bias variations at said first terminal of said interface means.

20. Apparatus according to claim 19, wherein
said feedback path comprises integrating amplifier means.

21. Apparatus according to claim 14, wherein
said interface means comprises a transistor with a base electrode corresponding to said first terminal, an emitter electrode corresponding to said second terminal, and a collector electrode corresponding to said third terminal.

22. Apparatus according to claim 14, wherein
said biasing means modifies the bias of said grid electrode during said sensing interval for inducing increased cathode current conduction to produce a cathode output current representative of the black current bias of said image reproducing device.

23. Apparatus according to claim 22, wherein
a current source provides a substantially constant DC operating current to said second terminal of said interface means during sensing intervals when said induced black current representative cathode current is present;
said output network comprises current to voltage translating means;
the impedance exhibited at said second terminal of said interface means is significantly greater than the impedance exhibited by said output network, and is primarily determined by the impedance presented by said cathode; and
said output network is selectively coupled to said current source via a feedback reference path during said reference intervals for biasing said current source to produce a substantially constant operating current and an associated reference bias condition for said interface means and said output network.

* * * * *